United States Patent
Jamjoom et al.

(10) Patent No.: US 10,832,160 B2
(45) Date of Patent: Nov. 10, 2020

(54) PREDICTING USER ATTENTIVENESS TO ELECTRONIC NOTIFICATIONS

(71) Applicant: International Business Machines Corporation, Armonk, NY (US)

(72) Inventors: Hani Jamjoom, Cos Cob, CT (US); David M. Lubensky, Brookfield, CT (US); Justin G. Manweiler, Somers, NY (US); Katherine Vogt, New York, NY (US); Justin D. Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 15/139,716

(22) Filed: Apr. 27, 2016

(65) Prior Publication Data
US 2017/0316320 A1 Nov. 2, 2017

(51) Int. Cl.
*G06N 20/00* (2019.01)
*G06Q 10/10* (2012.01)
*H04L 12/58* (2006.01)

(52) U.S. Cl.
CPC ........... *G06N 20/00* (2019.01); *G06Q 10/109* (2013.01); *H04L 51/24* (2013.01)

(58) Field of Classification Search
CPC .......... G06F 3/048; G06F 3/0481; G06F 3/01; G06F 15/173; G06F 17/30; G06F 9/00; G06N 5/04; G06N 7/00; G06N 7/005; G06N 99/00; G06N 99/005; G06N 20/00; G06Q 50/01; G06Q 10/109; H04W 4/02;
(Continued)

(56) References Cited

U.S. PATENT DOCUMENTS

| 8,848,879 B1 | 9/2014 | Coughlan et al. |
| 8,948,821 B2 | 2/2015 | Newham et al. |
| 9,026,780 B2 | 5/2015 | Ewell, Jr. et al. |

(Continued)

OTHER PUBLICATIONS

Dinger et al.; "I'll be There for You: Quantifying Attentiveness Towards Mobile Messaging", MobiHCI'15 ACM Proceedings of the 7th Inter. Conf. On, Aug. 24-27, 2015, pp. 1-5.
(Continued)

*Primary Examiner* — Dave Misir
(74) *Attorney, Agent, or Firm* — Harrington & Smith

(57) ABSTRACT

A database comprises historical information of a user's response to previous notifications. The database is accessed to determine a time at which to provide a (new) notification to the user, utilizing at least: a) current user activity status (e.g., determined from measurement information collected from one or more personal devices and/or user calendar events; b) time/day; and c) context information about the notification (e.g., geo-location, indoors/outdoors) including notification type (e.g., calendar entry, email, IM). The user gets the notification via a portable device at the determined time. A machine learning model can select the determined time by discriminating features of the previous notifications for which the user immediately attended versus those that were deferred and/or ignored. Content of the notification can also be altered in view of such discriminating features so as to increase a likelihood the user will immediately attend to the provided notification.

19 Claims, 4 Drawing Sheets

---

100: Notification Database for an Individual User

101: User activity status

102: Time and Day

103: Notification context information

104: Device context information

105: Physiological status

106: Notification content information

107: User device for notification

108: Response

(58) Field of Classification Search
CPC ....... H04W 4/12; H04W 88/00; H04W 88/02; H04B 1/38; H04L 29/08; H04L 51/24
USPC .......................................................... 706/11
See application file for complete search history.

(56) References Cited

U.S. PATENT DOCUMENTS

| | | |
|---|---|---|
| 2012/0239507 A1 | 9/2012 | Braginsky |
| 2013/0253910 A1* | 9/2013 | Turner .................. G06F 17/274 704/9 |
| 2013/0316744 A1* | 11/2013 | Newham ............... H04M 19/04 455/458 |
| 2014/0141816 A1 | 5/2014 | Winkler |
| 2014/0210702 A1 | 7/2014 | Peterson et al. |
| 2014/0235282 A1 | 8/2014 | Kansal et al. |
| 2014/0297758 A1 | 10/2014 | Kidron et al. |
| 2014/0372423 A1 | 12/2014 | Majumder et al. |
| 2015/0163188 A1 | 6/2015 | Faaborg et al. |
| 2015/0278195 A1* | 10/2015 | Yang ................... G06F 17/2785 704/9 |
| 2015/0339683 A1 | 11/2015 | Kannan |
| 2016/0036887 A1 | 2/2016 | Ilic et al. |
| 2017/0140285 A1* | 5/2017 | Dotan-Cohen ........ G06N 5/048 |
| 2018/0239815 A1* | 8/2018 | Yi ....................... G06F 17/2735 |

OTHER PUBLICATIONS

Pielot et al.; "Didn't You See My Message? Predicting Attentiveness to Mobile Instant Messages", CHI'14 ACM Proceedings, SIGCH Conf. On, Apr. 26-May 1, 2014 pp. 3319-3328.
Oh et al.; "An Intelligent Notification System Using Context From Real-Time Personal Activity Monitoring", ICME IEEE International Conf. On, Jun. 29-Jul. 3, 2015, pp. 1-6.
Poppinga et al.; Sensor-Based Identification of Oppotune Moments for Triggering Notifications, Pervasive Computing, IEEE, vol. 13, Issue 1, Jan.-Mar. 2014, pp. 22-29.
IP.com et al.; "Intelligent Method of Delivery Device Notifications", IPCOM000224850D, Jan. 8, 2013, pp. 1-2.

* cited by examiner

| Notification ID | User Activity | Time/Day | Notification Context | Device Context | Physiological Status | Content | User Device | Response |
|---|---|---|---|---|---|---|---|---|
| 01 | running | 0642 | SMS/MMS | home | BP=elevated | reply | watch | deferred |
|  |  | Tuesday |  | outdoors | HR=elevated | Mary | vibrate |  |
|  |  |  |  |  |  | scheduling |  |  |
|  |  |  |  |  |  | agitated |  |  |
| 02 | sedentary | 0800 | calendar-single | roaming | BP=avg | meeting | smartphone | deferred |
|  |  | Tuesday |  | Indoors | HR=avg |  | vibrate+tone |  |
| 03 | sedentary | 0817 | email | office | BP=avg | reply | laptop | attended |
|  |  | Tuesday |  | Indoors | HR=avg | Steve | tone |  |
|  |  |  |  |  |  | data |  |  |
|  |  |  |  |  |  | formal |  |  |
| 04 | sedentary | 0830 | voice call | office | BP=avg | Tom + Mary | smartphone | attended |
|  |  | Tuesday |  | Indoors | HR=avg |  | audible tone |  |
| 05 | sedentary | 0851 | SMS/MMS | office | BP=elevated | Tom | laptop | attended |
|  |  | Tuesday |  | indoors | HR=avg | data link | display |  |

FIG. 2

PREDICTING USER ATTENTIVENESS TO ELECTRONIC NOTIFICATIONS

TECHNICAL FIELD

The exemplary embodiments of this invention relate generally to user notifications presented on electronic devices, and more particularly toward analyzing users' responses to previous notifications to determine when the user is more likely to respond to a current notification.

BACKGROUND

Personal electronic devices have become ubiquitous and users typically receive notifications from such devices for a variety of matters. For example, it is common for a user's smartphone to provide a notification of a new email or text message, an incoming voice call, a new social media post, and an upcoming calendar event. The user may select from among various options so as to distinguish these different notifications from one another according to the notification type such as by selecting different audible tones for text versus email notifications. Sometimes the user tends to these notifications as they are made and other times such as when the user is in a formal meeting or on a pre-existing voice call the user is not able to do so.

Very busy people often need to deal with a large number of notifications as well as maintain focus on a given personal interaction or problem analysis and resolution. Users can mute sound to prevent audible notifications from their smartphones from distracting them but since this also mutes the ringtone for incoming voice calls this is not the most effective way to manage notifications from one's personal electronic devices; any incoming call may or may not be of an emergency nature. In general the vibrate-only option on smartphones is not selectable for only one type of notification so the user choosing this option would be notified via vibration of incoming calls as well as emails, new social media posts and the like.

What is needed is a better way to manage personal notifications that are presented to users through their electronic devices.

SUMMARY

In a first aspect thereof, embodiments of this invention provide a method comprising: in response to determining there is a notification for a user, accessing a tangibly stored database to determine a time at which to provide the notification to the user, wherein the database comprises historical information of previous times at which the user attended to previous notifications and the database is accessed utilizing at least: a) current activity status of the user as determined from measurement information collected from one or more personal devices and/or from a calendar listing events scheduled for the user; b) current time and day; and c) context information about the notification, where this context information is different from the measurement information and from the current time and day. Further, the context information includes at least type of the notification. The method further comprises causing a portable device to provide the notification to the user at the determined time.

In another aspect thereof the embodiments of this invention provide an apparatus comprising: one or more memories comprising computer-readable code, and one or more processors. The one or more processors are configured, in response to execution of the computer-readable code, to cause the apparatus to perform actions comprising: in response to determining there is a notification for a user, accessing a tangibly stored database to determine a time at which to provide the notification to the user, wherein the database comprises historical information of previous times at which the user attended to previous notifications and the database is accessed utilizing at least: a) current activity status of the user as determined from measurement information collected from one or more personal devices and/or from a calendar listing events scheduled for the user; b) current time and day; and c) context information about the notification, where this context information is different from the measurement information and also different from the current time and day. Further, this context information includes at least type of the notification. Execution of the computer-readable code further causes the apparatus to cause a portable device to provide the notification to the user at the determined time.

In yet another aspect thereof the embodiments of this invention provide a computer program product comprising a computer readable storage medium having program code embodied therewith. The program code is executable by a computing system to cause the computing system to perform: in response to determining there is a notification for a user, accessing a tangibly stored database to determine a time at which to provide the notification to the user, wherein the database comprises historical information of previous times at which the user attended to previous notifications and the database is accessed utilizing at least: a) current activity status of the user as determined from measurement information collected from one or more personal devices and/or from a calendar listing events scheduled for the user; b) current time and day; and c) context information about the notification, where this context information is different from the measurement information and from the current time and day. Further, the context information includes at least type of the notification. Then a portable device is caused to provide the notification to the user at the determined time.

BRIEF DESCRIPTION OF THE DRAWINGS

FIG. 2 shows in tabular form further detail of information for five different historical notifications that are stored in the FIG. 1 database, according to an embodiment of these teachings.

DETAILED DESCRIPTION

Figure 1:
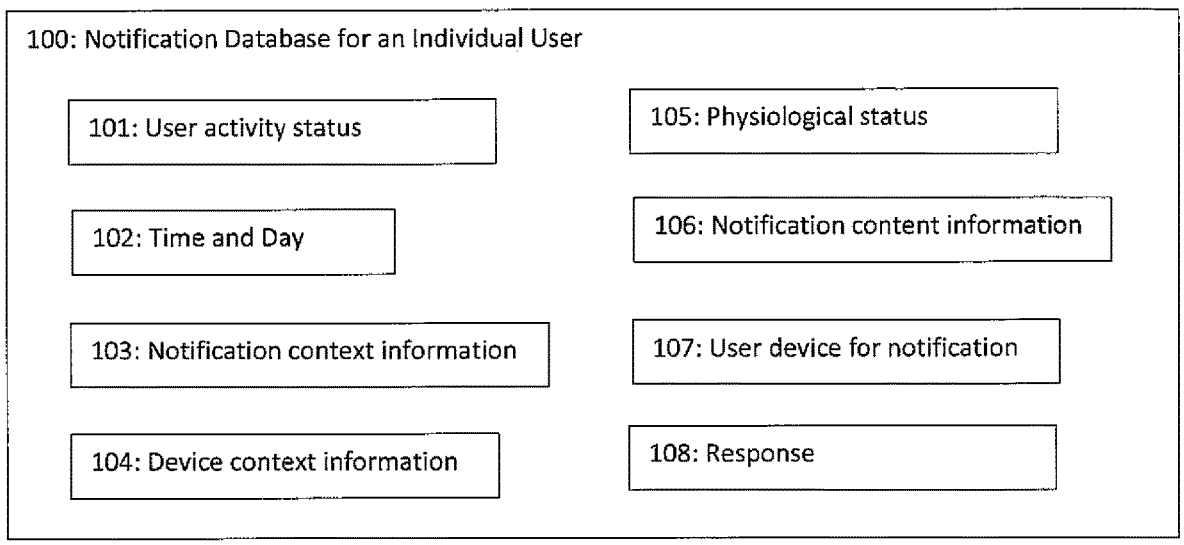
FIG. 1 illustrates in schematic view an individual user's database with different categories of information stored therein according to an embodiment of these teachings.

The examples below assume the user's portable device, at which a new or current notification is presented to the user according to these teachings, is a mobile terminal such as a smartphone but this is a non-limiting example. Other examples include the user's laptop/tablet/desktop computer, or a peripheral device such as a smartwatch or other wearable device, or an implantable device since human-implantable implementations of personal electronics may become more ubiquitous in the future. In one case the software that implements features of the invention detailed herein is aware of multiple electronic communications devices associated with the user and is further aware which of such devices the user is logged onto or otherwise active on at any given time. In other cases peripheral devices and/or implanted devices are active when they have an active communication link such as Bluetooth® with another known user device such as a smartphone or tablet, in which case the notification to the user may be sent to the peripheral/implanted device via that link.

Notifications may in general be implemented across a wide variety of means, and in each implementation the portable electronic device attempts to gain the attention of the user for an event that is the subject of the notification. Vibrating the device, displaying a text notification on a display screen of the device along with an audible tone, and strobing a camera flash or display screen backlight are all well-known non-limiting examples of implementing a user notification. Notifications can be for a wide variety of events, including for example an incoming email or text message, an incoming voice call, a new online post to a social media or news site the user has opted to be notified about, a newly posted file awaiting viewing or download by the user, an individual or repeating event in the user's personal electronic calendar, a public service announcement such as an urgent weather or public safety matter, a warning that one or more user health metrics being monitored by a peripheral or implanted device is has entered a range of concern, and a warning that the user's device has sensed the user is approaching overexposure to UV rays or other environmental metric. In this regard notification refers to the device's initial attempt to alert the user of a new event. So for example if a user's smartphone sounds an audible tone when there is a new incoming SMS/MMS message and displays that message text only after the user makes a positive input to the smartphone, the audible tone is the notification but the display of the message text is not because that display occurred only in response to the user's positive input and therefore is not done to alert the user of the incoming message event.

Certain embodiments of these teachings encompass a database built from historical notifications to the user, such that with each historical notification there is associated certain data by which the implementing software can discern patterns from this particular user's history about what information makes it more likely that this particular user will immediately respond to a new notification. Examples of this data associated with each historical notification include the user's response to that notification if any, information about the user at the time of that notification such as the user's activity status (walking, sedentary), context information about that notification such as time and day of week the notification was made to the user, context information of the portable device itself such as geographic location, and even content of the notification itself such as who sent the incoming message as well as its text content. Come embodiments may also store the user's physiological status such as heart rate, blood pressure and the like for these historical notifications, as well as which of several devices associated with this same user was used to make the historical notification.

The database is therefore an important feature of these teachings. In some embodiments the database may be stored in the local memory of the user's smartphone or other portable device itself, while in other embodiments these teachings utilize a cloud-based service and the database and analytics are on one or more servers remote from the user's device but in electronic communication therewith. In the latter case incoming voice, text and email messages and notifications of new social media or news postings for example can be analyzed and compared to the remote database before the user's personal device has any information there is even a new notification. In other implementations, prior to presenting any notification to the user the device sends to the cloud-based service the relevant information for searching the database as detailed below. Embodiments of these teachings therefore can build such a database as the number/volume of notifications to a given user becomes sufficient to populate such a database, and further can update and modify such as database as the user's responses to new notifications is added to it and affects previously-discerned patterns.

While data of individual historical notifications may be used to build the database, this does not preclude any of the following: culling from the database information about notifications dated some minimum threshold prior to the current date; aggregating information from similar historical notifications; and weighting different notifications differently when analyzing the database to find a pattern of features similar to the features of a current notification. Examples of differentially weighting the historical notifications include: more recent notifications are weighted heavier than older ones; and/or historical notifications with 6 of 9 matching features are weighted heavier than notifications with 3 of 4 matching features (where information about each possible feature is not recorded in the database for each historical notification).

FIG. 1 illustrates in schematic view different categories of information that may be stored in an individual user's database 100 according to these teachings. In practice such databases may use some or all of these example categories, while some may include information of further categories not specifically described herein. One category carries information about user activity status 101, such as for example whether the user is walking or running/jogging or sedentary. This information can be gathered from the smartphone's accelerometer, or from similar sensors at peripheral wearable devices such as a watch or bracelet, or from location information at the smartphone from GPS or triangulation among transmitters for example. This information may come from other peripheral devices that are interconnected via the Internet of Things concept, such as for example television, bathroom sensors, kitchen sensors, security cameras, and the like. Refinements to these measured results may incorporate information from the user's electronic calendar stored on the smartphone and/or on the cloud, whether the smartphone or other user device is active on a web-page, and the like.

Another category carries information about time and day 102 of a given notification. This may be a timestamp supplemented with information about whether the date is a weekday or weekend. Holidays that fall on weekdays may be characterized as weekends for purposes of the database. This timestamp field may also be used to cull the database of dated information and/or to differentially weight certain historical notifications that are later in time higher than others that are earlier in time.

Another category carries context information about the notification 103. This category can also include the type of notification, for example whether it was a single calendar event, a repeating calendar event, an instant message (SMS or MMS), an email message, a voice call, an alert that there is a new posting on a news or social media site, and the like. In practice the software can determine the notification type for at least some of these types from the smartphone application that originates the message, for example SMS app, email app, social media app, and the like.

A further category of information in the database 100 includes context information about the user device 104 used for that historical notification. Device context information 104 can for example include for example the location at which that historical notification was presented to the user as well as whether that device was indoors or outdoors at the time.

Some embodiments of these teachings may also include in the database 100 physiological status information 105 about the user at the time the historical notification was presented. As non-limiting examples, the metrics that give the user's physiological status at the time the historical notification was presented may include blood pressure, heart rate, blood glucose level, and time since the user last ate or time differential over the user's routine eating time. This information can be determined for example from measurement information collected from the one or more peripheral devices that measure and track the user's personal health status such an electronic watch, a physiology monitoring electronic bracelet, and implanted device, etc. This information may also come from pre-existing physiological data collection sources such as a health tracking app on the user's smartphone which may utilize similar physiological sensors or which may only track accelerometer data and interpret health data therefrom (similar to interpreting distance walked from a pedometer).

Another different category of information in the database 100 is notification content information 106 that reflects content of the historical notification itself. This content information may be direct content or it may be decided by an analysis of the direct content. In the direct content class of information is the sending party, whether the notification is a reply to the user's earlier message to that sending party, and the objective content of the message itself such as whether it relates to an event in the user's electronic calendar, or whether it is personal to the user or business related. The indirect class of content information can be extracted using textual analytics performed on the text of emails and instant messages. For example, textual analytics can determine a tone of the message, whether it is a positive or negative message by counting the presence of certain words that reflect that characteristic, or even the mood of the message author such as via a psycholinguistic analysis of the message text. The results of these analytics may be kept in the database as additional features of the historical notification.

A further category of information in the database 100 is user device information 107. It is common for some individual users to move information seamlessly among different personal devices such as laptop, tablet; smartphone, desktop computer and the like. In the database the individual user device used to alert the user is listed along with the other information about that historical notification. If a user is working on his laptop with his smartphone nearby, typically an incoming SMS message will alert on the smartphone first followed by the laptop due to a minor but noticeable delay in getting the SMS message through internet pathways as compared to cellular pathways. In this or other cases in which the notification is sent on multiple devices such as a notification on a user's smartphone and connected electronic watch, the database may track only the device at which the user entered his response. This category 107 of information may also include the format used to present the notification (e.g., the specific implementation of the notification), for example vibrate the user device, vibrate plus audible tone, audible tone, visual display, audible text and the like.

The final category of database information shown at the FIG. 1 database 100 is the user response 108 to the historical notification. The user's response to the notification may for example be categorized as ignored, deferred, or attended; where ignored means the user never responded to the notification within some long threshold time, attended means the user responded to the notification within a short threshold time, and deferred means the user responded to the notification at a time between the long and short threshold times. The user response may be considered as being present when the user positively interacts with the device, for example by tapping or swiping on the notification presented at the touch sensitive display screen, opening up the originating application, depressing either the answer or ignore call button for voice calls, or some other positive user entry (including voice commands) using a user interface of the device. Additionally or alternatively the user response may be considered as being present when a prescribed movement of the device is sensed by an accelerometer or other sensor of the device, for example movement of the smartphone or tablet from a lay-flat to a more vertical position, or movement of a smartwatch upward some minimum threshold distance or across some minimal threshold rotation that indicates the user is raising or rotating his hand to view the notification. When a user does not interact with the notification and no accelerometer activity is present within the prescribed time period, the notification may be considered ignored. When the user response is classified as being deferred, the database 100 may store the time at which the user responded or it may classify various deferrals in terms of time ranges, for example: >1 to 5 minutes deferred; >5 to 15 minutes deferred; and >15 minutes deferred.

FIG. 2 is the FIG. 1 database 100 in tabular form showing entries for five different historical notifications. It is convenient in practice to use the notification timestamp as the notification identifier (ID) but for simplicity FIG. 2 uses only two digits for that ID that uniquely distinguishes each notification in the user-specific database from each other. Each cell of the database table at FIG. 1 other than the column titles and the notification ID may be considered to represent a feature that may be used to find patterns among the historical notifications and to search the database when there is a new notification in order to determine the most opportune time and manner to present that notification to the user. In order to readily classify the notifications according to these features, the information recorded for each and every feature can be considered as a selection from a closed menu of choices, for example: ignored/deferred/attended are the only choices for user response; instant message (SMS/MS)/email/voice call/calendar-single/calendar-repeating/social media are the only choices for notification context; home/office/roaming/Mom's/Deborah's are the only choices for one of the device context features, and so forth. For some of the notifications there may be some features for which no information is recorded; for example if the user wears his fitness bracelet only while exercising and not throughout the entire day. Other features such as textual analysis of notification content may be relevant only for certain types of notifications such as instant messages and emails but not for others such as a voice call.

For the notifications at FIG. 2 the true activity of the user is as follows: after waking up the user jogs between 6:30 and 7 am, commutes to arrive at the office by 8 am but this particular Tuesday the user is a bit late, checks his email when arriving at his office then engages in a previously scheduled teleconference between 8:30 and 9 am. In this period of time the user receives the five notifications at FIG. 2.

Notification ID=01 is a SMS message notified to the user at 6:42 am by vibrating his smartwatch. The user did not respond right away but deferred for some time without ignoring it; this is because he was jogging as mentioned above which the database stored as running due to readings from the smartphone's accelerometer analyzed over a period of time for example. The day of the week Tuesday is readily obtained from the timestamp with reference to a calendar. The context of the smartwatch which presented the notification is at home (for example, within a prescribed radius of the user's home location) and another feature of the device context is outdoors, which the smartwatch or smartphone can sense from a change in temperature starting at about 6:30 am from the thermostatically controlled home. Since the user is in fact jogging the physiological status shows an elevated heartrate (HR) and blood pressure (BP). As another example the selectable options for the physiological metrics may be high//elevated/average/low-normal/too-low, each reflecting a certain range of the metric. The message content is recorded in the database 100 as being a reply, from Mary, that concerns a scheduling issue (for example, the previously-scheduled teleconference mentioned above) and that the content indicates that Mary is agitated. In this case the agitation may be from a change to the agenda of that teleconference that Mary's SMS message indicates, since that teleconference is scheduled to begin in less than 2 hours.

According to the above summary of the user's true activity on Tuesday morning, notification ID=02 occurs while he is enroute to the office but late. At precisely 8 am there is a notification of a single (non-repeating) calendar event, in this case the teleconference that is to begin at 8:30 am that is specified as 'meeting' by consulting the calendar event being notified (in this example both teleconference and physical meeting are both categorized the same). The notification is presented to the user by simultaneously vibrating the smartphone and issuing an audible tone, and the device context shows it is not at any pre-recognized locations and so the generic 'roaming' is entered. The device is determined to be indoors and the user activity is sedentary, which matches the user still sitting in his vehicle at the time of the notification. This user wears his health monitoring bracelet throughout the day but it records only average readings at 8am, and the user defers responding to this notification of the calendar event.

The other notifications follow the two examples above. Notification ID=03 is an email from Steve notified via audible tone on the user's laptop computer and Steve's email has a link to a document-sharing web service (the indicated 'data') and the tone is businesslike which is categorized as formal; the user attends to this notification without deferring while sedentary at his desk. Notification ID=04 is an incoming voice call that is the scheduled conference call/meeting; being a conference call both Tom and Mary are listed as the FROM party. Tom on the conference call sends a SMS message with a data link to the user at 8:51 am while the call is still ongoing, which is presented to the user via his laptop at a time during which the user's blood pressure has become a bit elevated.

Assume a database as in FIG. 2 but with thousands or many thousands of notification entries. Now there is a new notification to present to the user. Prior to presenting that notification, every feature shown at FIG. 2 can be known about it except the exact time, the user device features and the response. Certain features such device context can use the device context of this not-yet presented current notification, in order to access the database and find patterns of historical notifications that were attended by the user. In this manner the implementing software can select the time, the device and the manner of presenting the notification to the user so as to increase the likelihood that the user will respond to the notification quickly rather than defer or ignore it.

For example, if a new notification is to be presented to the user and the current time is 6:37 am on a weekday, the historical database for the user described for the FIG. 2 database would indicate that this user typically defers notifications at that time (assuming the examples at FIG. 2 are extended to produce a statistically reliable projection). In this case the software implementing these teachings may select a time after 7:00 am that same day to present the notification. Searching the database in this manner may also show that sending the notification to the user's smartphone is more likely to result in an 'attended' response than sending it to his laptop or tablet or desktop computers, so the implementing software would then select this user's smartphone as the user device to present this current notification. Further extracting patterns from the historical notification database may reveal that strobing the smartphone's camera flash while vibrating is more likely to result in an 'attended' response than other formats for presenting the notification in which case the implementing software would choose that format for the current notification.

The implementing software may in some embodiments be based on modeling the user's behavior in order to predict the time and/or device and/or format for the current notification that is most likely to draw an immediate response from the user. As above, that response can be defined in different ways. If the sender of a text message is displayed on the user's watch even without the user opening the instant messaging application, the fact that the user viewed that sender information immediately means the software has successfully changed the notification time and device so as to draw an immediate response.

It may be the sender chooses not to open the instant messaging application because the current message is from that particular sender. In this case registering movement of the smartwatch via its internal accelerometers is a more accurate tally of the user response the implementing software seeks to achieve than if 'attended' were registered only from the user opening the instant messaging application to read the entire message or otherwise interacting with a user interface of the smartwatch or connected smartphone. Registering a deferred response may in some embodiments require user interaction with a user interface (e.g., the user interacting with the notification such as by opening the instant messaging application, viewing a call log when there is a recently missed call, and so forth). This is because in the above example, there is significantly less confidence that movement of the user's smartwatch at some time not immediately following presentment of the notification actually reflects the user attending to the notification. Attending to the notification is distinct from merely becoming aware of the notification, the latter can occur through the format of presentment which may be only a vibration or audible tone.

The above leads to an aspect of the invention in that, for the case that 'deferred' is one of the selectable options for the feature 'user response', the implementing software may use one set of criteria to determine that the user response is 'attended' and a wholly different set of criteria to determine that the user response is 'deferred'. In the above example the 'attended' criteria includes a specified minimum movement of the smartwatch within some short threshold of time from presentment of the notification, while the 'deferred' criteria includes user interaction with the originating application within some medium range of time that begins at the short threshold. The different time criteria divide the 'attended' time window from the 'deferred' time window, but the other criteria to determine whether the user attended to the presented notification are wholly different definitions of what is considered to be a user response.

Certain embodiments of these teachings therefore provide a method for learning a time at which a notification should be displayed to a mobile phone user based on modeling the times at which the user has previously attended to such notifications. When a user receives a notification to their mobile device, they may attend to it instantly such as either by lifting their device or directly interacting with the notification, or they may ignore the notification such as by not lifting their device. In the case of ignoring a notification, a user may choose to attend to that notification at a later time such as by viewing the notification on the notifications screen and interacting with it there. By keeping a history of notifications (including their content and originating application), the times at which the notifications were sent, and the times at which the user attended to the notification, a model is built for more appropriate times to display future notifications. The goal of this modelling is to display or otherwise present future notifications when the user is more likely to attend to them.

Now consider some simplified steps as an example for implementing such teachings. First a notification database is created to store details of notifications received by a user's mobile device. This database tracks the following kinds of information about notifications: the originating app, the content of the notification, the time at which the notification was sent (timestamp, time of day, day of week), the device the notification on which the notification was presented (e.g. desktop, phone, tablet, watch), the physical context of the device (location, indoors vs. outdoors), the activity status of the person using the device (for example, walking, running, driving, in a meeting, cooking), and/or the physiological status (for example, heart rate, blood pressure, time since slept, time since eaten). In addition, the user's response to the notification (ignored, deferred, attended) is kept.

In certain implementations the activity status can be determined through the mobile phone accelerometer, wearable devices, GPS movement, individual's calendar, and/or home environment usage (for example, TV, bathroom sensors, kitchen sensors). Further, the physiological status may be collected by additional smart, connected wearable devices and reported into a separate database, such as the iOS HealthKit. If there are textual analytics this function may be performed on the content of notifications, such as measuring the tone of a message, counting the presence of positive/negative affect words, or judging the personality of the author of the method (for example, psycholinguistic analysis). The results of these analytics may be kept in the database as additional features of the notification.

In further implementations the user's response to the notification (ignored, deferred, attended) may be detected in the following manner: A) when the notification is first presented, accelerometer activity on the device indicating movement (for example, raising a watch, lifting a smartphone or tablet) may indicate the user is attending to the notification; B) when a user interacts directly with the notification (e.g. tapping or swiping on it), it indicates the user is attending to the notification; C) when a user does not interact with the notification and no accelerometer activity is present, the notification may be considered ignored; and D) when a user at a later time interacts with an ignored notification, that notification is considered deferred and the time at which the user interacted with the notification is recorded.

Once that database is built, machine learning models are trained using the data from the notification database to discriminate features of notifications that the user ignores versus attends. These models provide a global filter on notifications that the user never attends versus the notifications they do attend, either immediately or deferred. In certain embodiments additional models are trained to discriminate between notifications the user immediately attends to or defers.

Now with the machine learning model trained, when a new mobile notification arrives its features are run through the machine learning models to determine: A) whether the notification should be displayed or discarded; B) an appropriate time to display the notification (immediately or at a later time); C) whether the content of the notification should be altered; and D) the means of notification presentation.

In some embodiments the time at which the notification is displayed may be determined by examining when the user typically attends to that kind of notification, for example by finding similar deferred notifications and looking at the time and context at which the user attended to those. In a particular implementation a separate module may alter the content of the notification to increase the likelihood the user attends to it. For example, the system may change the content of the notification based on the physical condition of the user; e.g., if the user has high blood pressure, negative emotional words may be stripped out and additional positive emotional words may be inserted into the textual content of the notification. The means of notification presentation may include which device at which to present the notification (for example watch vs. smartphone vs. desktop vs. tablet) based on the devices in range of the user, and the device used by the user to attend to similar notifications in the past. In this regard the means of notification presentation may also include the format in which the notification is presented, such as auditory, visual, vibration, spoken text, written text.

Figure 3:
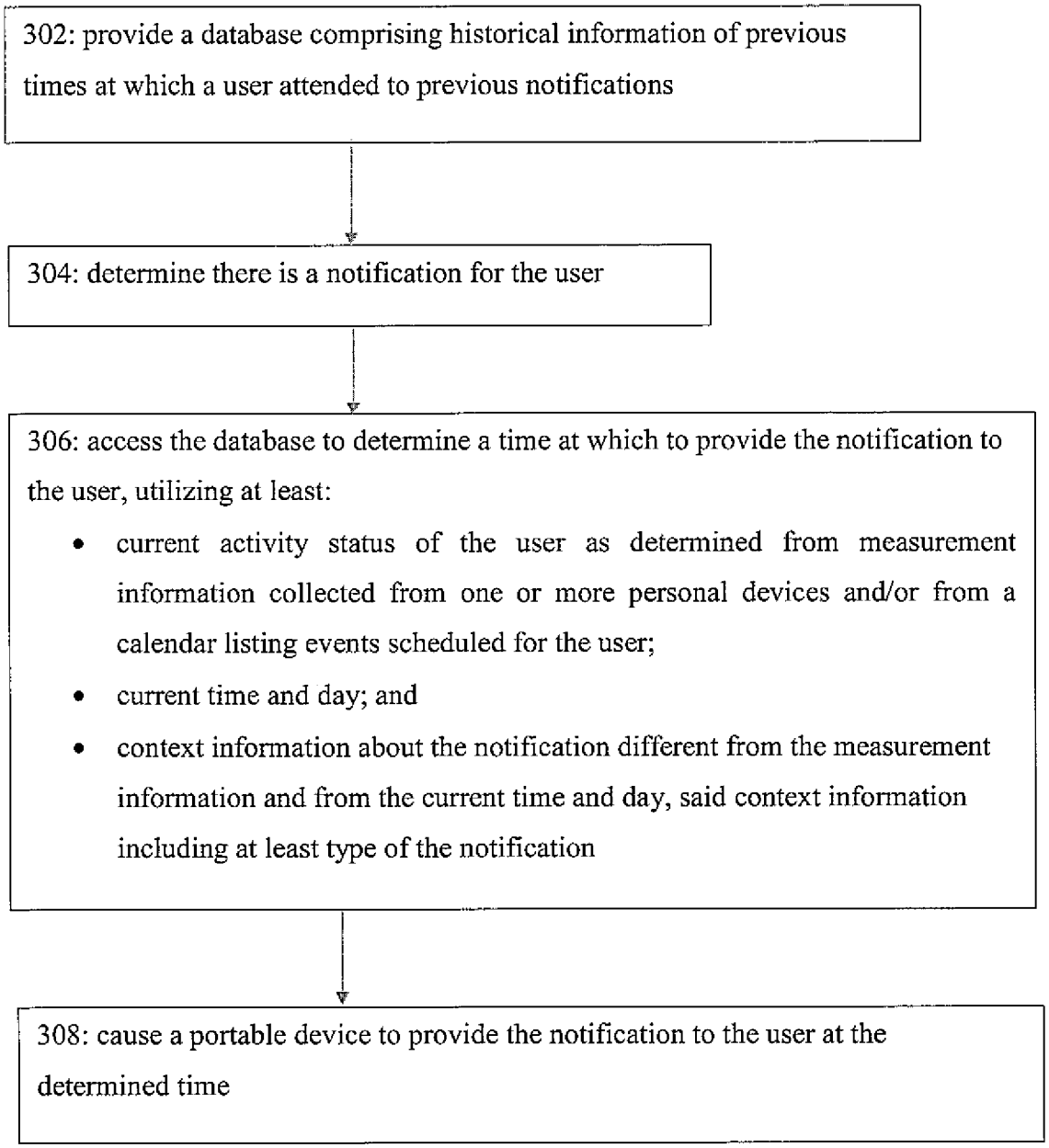
FIG. 3 is a process flow diagram summarizing certain aspects of these teachings, and may represent steps of a method or functions performed by a device such as the user's electronic device alone or in conjunction with a cloud-based server at which the database may be stored.

FIG. 3 is a process flow chart summarizing certain aspects of these teachings, and the steps shown there and detailed further below may represent steps of a method, or functions performed by a device such as the user's electronic device alone or in conjunction with a cloud-based server which may store the user's database. At block 302 a database is provided comprising historical information of previous times at which a specific user attended to previous notifications. This database is tangibly stored, for example on a user electronic device or on a cloud based server. At block 304 there is a new notification for this user, and at block 306 in response to determining there is the block 304 notification, the database of block 302 is accessed to determine a time at which to provide the notification to the user. More specifically, this database is accessed utilizing at least: A) current activity status of the user as determined from measurement information collected from one or more personal devices and/or from a calendar listing events scheduled for the user; B) current time and day; and C) context information about the notification. This context information is different from the measurement information and also different from the current time and day, and this context information includes at least type of the notification. Then at block 308 a portable device is caused to provide the notification to the user at the determined time from block 306.

As further detailed above, in certain embodiments FIG. 3 is expanded so that, using measurements from the portable device, the user's response to the notification that was provided at the determined time is determined, where this determined user's response is selected from among at least attended, deferred and ignored. The database is then updated with information about the determined user's response including at least A) activity status of the user at the time of the determined response as determined from measurement information collected from one or more personal devices including the portable device; B) time and day of the determined response; and C) context information about the provided notification different from the activity status of the user at the time of the determined response and from the time and day of the determined response.

In another aspect of the invention the type of the notification at block 306 of FIG. 3 is selected from among at least single calendar entry, repeating calendar entry, instant message and email message. In other various aspects the database is accessed as at block 306 of FIG. 3 further utilizing context of the portable device including geographic location and whether the device is indoors or outdoors at the current time and day; and/or further utilizing physiological status (including at least blood pressure and heart rate) of the user as determined from measurement information collected from the one or more personal devices; and/or further utilizing content of the notification including machine-based analytics of mood and/or tone of said content.

In further implementations the time at block 306 of FIG. 3 is determined using a tangibly embodied software comprising a machine learning model that selects the determined time by discriminating features of the previous notifications for which the user immediately attended versus the previous notifications that the user deferred and/or ignored. In a further aspect this machine learning model is utilized to alter the content of the notification in view of the discriminating features so as to increase a likelihood the user will immediately attend to the provided notification.

Yet a further aspect of the invention is that the database may be accessed to further select the portable device over which to provide the notification to the user, and to select a form of the provided notification from among at least visual, vibration, alerting tone, spoken text and written text.

Figure 4:
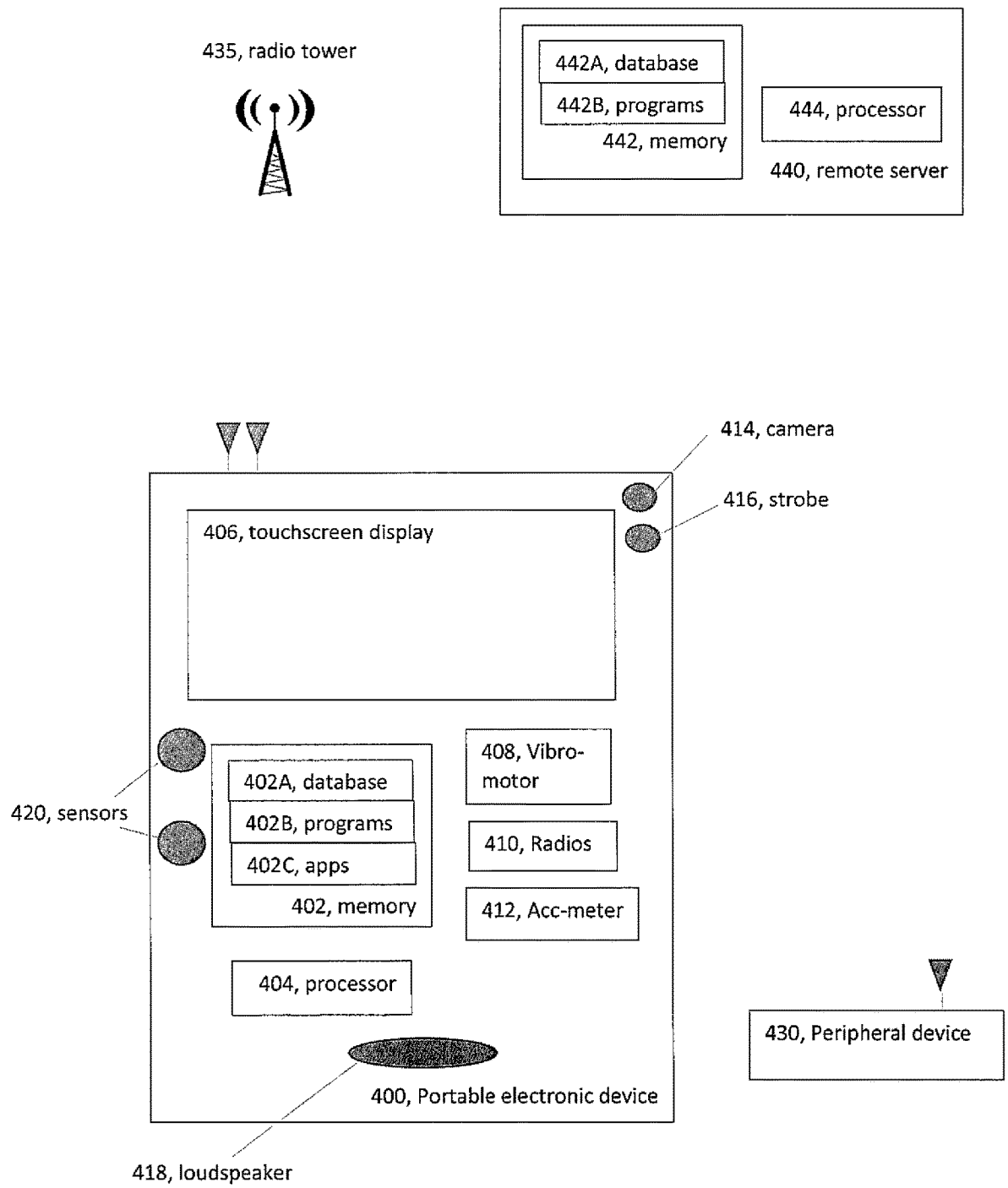
FIG. 4 is a schematic block diagram of an example portable electronic device that is suitable for practicing certain aspects of the invention, which in some embodiments can be done in conjunction with a remote server and/or a peripheral device also shown at FIG. 4.

FIG. 4 is a schematic block diagram of a portable electronic device 400 suitable for practicing certain aspects of the invention, and also a peripheral device 430 and remote server 440. In certain embodiments the portable electronic device 400 includes at least a memory 402 storing the database 402A as described above, various computer programs 402B such as the one entering and searching the database as described above as well as text analytics and the like in other options, and also smaller programs known as applications or apps 402C that might be accessed by the implementing program to find the originator of a current notification. Various other memories such as frame memory, RAM, DRAM, SDRAM and the like are assumed. The device 400 is run by a processor 404 (typically more than one but one is shown for simplicity of explanation) that executes the programs 402B and apps 402C.

The device 400 may have a touch sensitive graphical interface shown as the touchscreen display 406, optionally a camera 414 with one or more strobes 416 that may be used with the invention as detailed above, a loudspeaker 418 for presenting audible notifications, and sensors 420 such as physiological sensors and environmental sensors detailed above. There is typically also a vibration motor 408 that causes the device 400 to present a notification as a vibration; there are one or more radios 410 for communicating wirelessly with peripheral devices 430 directly as described, and/or for communicating wirelessly a remote server 440 via a radio tower 435. Finally the device 400 may have one or more accelerometers 430 for sensing velocity changes of the device 400. For all of these a clock is inferred to be present in the processor 404 and providing necessary timing signals to the various described components for synchronous operation, but in some implementations one or more of such other components may run their own internal clock that may or may not be slaved to the main processor clock. All of these various components of the device 400 are interconnected though the various busses and electrical interconnects that are assumed in FIG. 4 so as not to clutter the relevant components.

If certain aspects of these teachings such as storage of the remote database and/or execution of the search/text analytics/etc. programs are done remote from the user's device 400, such remote actions may be performed at a server 440 that has a memory 442 storing a database 442A and computer programs 442B similar to those described for the device 400. Such a remote server 440 may also have one or more processors 444.

Peripheral devices 430 may also be used in conjunction with the portable electronic device 400 to collect information for the database and to present notifications to the user according to certain implementations of these teachings. Such peripheral devices will also include a memory storing a program or programs, and possibly also sensors, accelerometers, vibration motors, displays and other components described with reference to the portable electronic device 400. Both the portable electronic device 400 and the peripheral device 430 may obtain energy from a galvanic power source such as a battery (not shown).

In the foregoing description, numerous specific details are set forth, such as particular structures, components, materials, dimensions, processing steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or processing steps may have been omitted or may have not been described in order to avoid obscuring the presented embodiments. It will be understood that when an element as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

The description of the present invention has been presented for purposes of illustration and description, but is not intended to be exhaustive or limiting in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular uses contemplated.

The present invention may be implemented as a system, a method, and/or a computer program product. The computer program product may include a computer readable storage medium (or media) having computer readable program instructions stored thereon for causing a processor to carry out certain aspects of the present invention.

The computer readable memory/storage medium can be a tangible device that can retain and store instructions for use by an instruction execution device (such as the data processor). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent vulnerability types may be used by those skilled in the art. However, all such and similar modifications of the teachings of this invention will still fall within the scope of this invention.

What is claimed is:

1. A method comprising:
   in response to a processor determining there is a notification for a user, accessing by the processor a tangibly stored database to determine a time at which to provide the notification to the user, wherein the database comprises historical information of previous times at which the user attended to previous notifications and the database is accessed utilizing at least:
   current activity status of the user as determined from measurement information collected from one or more personal devices and/or from a calendar listing events scheduled for the user;
   current time and day; and
   context information about the notification different from the measurement information and from the current time and day, said context information including at least type of the notification;
   causing a portable device to provide the notification to the user at the determined time; and
   using measurements from the portable device, determining the user's response to the notification that was provided at the determined time, said determined user's response selected from among at least attended, deferred, and ignored;
   updating the database with information about the determined user's response including at least activity status of the user at the time of the determined response as determined from measurement information collected from the one or more personal devices including the portable device and further accessing physiological status of the user as determined from measurement information collected from the one or more personal devices including the portable device;
   wherein an attended user's response is based on a movement within a first specified time after the notification, a deferred user's response is based on a user interaction within a second specified time, or an ignored user's response is based on a lack of response;
   wherein the database is accessed to determine the time at which to provide the notification to the user further utilizing analysis of notification content information that reflects content of the historical information in conjunction with analysis of text from previous user responses to determine content of the notification including machine-based analytics of mood and/or tone of said content.

2. The method according to claim 1, further comprising:
   updating the database with information about the determined user's response including at least
   time and day of the determined response; and
   context information about the provided notification different from the activity status of the user at the time of the determined response and from the time and day of the determined response.

3. The method according to claim 1, wherein the type of the notification is selected from among at least single calendar entry, repeating calendar entry, instant message and email message.

4. The method according to claim 1, wherein the database is accessed to determine the time at which to provide the notification to the user further utilizing:
   context of the portable device including geographic location and whether the device is indoors or outdoors at the current time and day.

5. The method according to claim 1, wherein the physiological status includes at least blood pressure and heart rate.

6. The method according to claim 1, wherein the determined time is determined using a tangibly embodied software comprising a machine learning model that selects the determined time by discriminating features of previous notifications for which the user immediately attended versus previous notifications that the user deferred and/or ignored.

7. The method according to claim 6, the method further comprising:
   utilizing the machine learning model to alter the content of the notification in view of the discriminating features so as to increase a likelihood the user will immediately attend to the provided notification.

8. The method according to claim 1, wherein the database is accessed to further select the portable device over which to provide the notification to the user, and to select a form of the provided notification from among at least visual, vibration, alerting tone, spoken text and written text.

9. The method according to claim 1, wherein the notification content information that reflects content of the historical information comprises one or more of who a sending party is, whether the notification is a reply to an earlier message, and objective content of the notification.

10. An apparatus comprising:
    one or more memories comprising computer-readable code and one or more processors, wherein the one or more processors are configured, in response to execution of the computer-readable code, to cause the apparatus to perform actions comprising:

in response to a processor determining there is a notification for a user, accessing by the processor a tangibly stored database to determine a time at which to provide the notification to the user, wherein the database comprises historical information of previous times at which the user attended to previous notifications and the database is accessed utilizing at least:

current activity status of the user as determined from measurement information collected from one or more personal devices and/or from a calendar listing events scheduled for the user;

current time and day; and context infoiiaation about the notification different from the measurement information and from the current time and day, said context information including at least type of the notification;

causing a portable device to provide the notification to the user at the determined time; and using measurements from the portable device, determining the user's response to the notification that was provided at the determined time, said determined user's response selected from among at least attended, deferred, and ignored;

updating the database with information about the determined user's response including at least activity status of the user at the time of the determined response as determined from measurement information collected from one the or more personal devices including the portable device and further accessing physiological status of the user as determined from measurement information collected from the one or more personal devices including the portable device;

wherein an attended user's response is based on a movement within a first specified time after the notification, a deferred user's response is based on a user interaction within a second specified time, or an ignored user's response is based on a lack of response;

wherein the database is accessed to determine the time at which to provide the notification to the user further utilizing analysis of notification content information that reflects content of the historical information in conjunction with analysis of text from previous user responses to determine content of the notification including machine-based analytics of mood and/or tone of said content.

11. The apparatus according to claim 10, the actions further comprising:

updating the database with information about the determined user's response including at least time and day of the determined response; and context information about the provided notification different from the activity status of the user at the time of the determined response and from the time and day of the determined response.

12. The apparatus according to claim 10, wherein the type of the notification is selected from among at least single calendar entry, repeating calendar entry, instant message and email message.

13. The apparatus according to claim 10, wherein the database is accessed to determine the time at which to provide the notification to the user further utilizing:

context of the portable device including geographic location and whether the device is indoors or outdoors at the current time and day.

14. The apparatus according to claim 10, wherein said physiological status includes at least blood pressure and heart rate.

15. The apparatus according to claim 10, wherein the determined time is determined using a tangibly embodied software comprising a machine learning model that selects the determined time by discriminating features of the previous notifications for which the user immediately attended versus the previous notifications that the user deferred and/or ignored.

16. The apparatus according to claim 15, the actions further comprising:

utilizing the machine learning model to alter the content of the notification in view of the discriminating features so as to increase a likelihood the user will immediately attend to the provided notification.

17. The apparatus according to claim 10, wherein the database is accessed to further select the portable device over which to provide the notification to the user, and to select a form of the provided notification from among at least visual, vibration, alerting tone, spoken text and written text.

18. A computer program product comprising a computer readable storage medium having program code embodied therewith, the program code executable by a computing system to cause the computing system to perform:

in response to a processor determining there is a notification for a user, accessing by a processor a tangibly stored database to determine a time at which to provide the notification to the user, wherein the database comprises historical information of previous times at which the user attended to previous notifications and the database is accessed utilizing at least:

current activity status of the user as determined from measurement information collected from one or more personal devices and/or from a calendar listing events scheduled for the user;

current time and day; and context information about the notification different from the measurement information and from the current time and day, said context information including at least type of the notification;

causing a portable device to provide the notification to the user at the determined time; and using measurements from the portable device, determining the user's response to the notification that was provided at the determined time, said determined user's response selected from among at least attended, deferred, and ignored;

updating the database with information about the determined user's response including at least activity status of the user at the time of the determined response as determined from measurement information collected from the one or more personal devices including the portable device and further accessing physiological status of the user as determined from measurement information collected from the one or more personal devices including the portable device;

wherein an attended user's response is based on a movement within a first specified time after the notification, a deferred user's response is based on a user interaction within a second specified time, or an ignored user's response is based on a lack of response;

wherein the database is accessed to determine the time at which to provide the notification to the user further utilizing analysis of notification content information that reflects content of the historical information in conjunction with analysis of text from previous user responses to determine content of the notification including machine-based analytics of mood and/or tone of said content.

19. The computer program product according to claim 18, the program code executable by a computing system to cause the computing system to further perform:
  updating the database with information about the determined user's response including at least
  time and day of the determined response; and
  context information about the provided notification different from the activity status of the user at the time of the determined response and from the time and day of the determined response.

\* \* \* \* \*